United States Patent [19]

Hess et al.

[11] Patent Number: 4,482,584
[45] Date of Patent: Nov. 13, 1984

[54] PAINTING A BAND ON A TUBE

[75] Inventors: Walter Hess; Franz Nicolai; Otto Götting, all of Mülheim, Fed. Rep. of Germany

[73] Assignee: Mannesmann AG, Duesseldorf, Fed. Rep. of Germany

[21] Appl. No.: 401,616

[22] Filed: Jul. 26, 1982

[30] Foreign Application Priority Data

Jul. 27, 1981 [DE] Fed. Rep. of Germany ....... 3130119

[51] Int. Cl.³ .............................................. B05D 1/02
[52] U.S. Cl. ................................... 427/286; 118/665; 118/691; 118/323; 427/424
[58] Field of Search ...................... 118/665, 323, 691; 427/286, 424

[56] References Cited

U.S. PATENT DOCUMENTS

| 1,912,758 | 6/1933 | Capstaff | 427/286 X |
| 3,229,660 | 1/1966 | McLucas et al. | 118/323 X |
| 3,592,387 | 7/1971 | Pilott | 118/323 X |
| 4,097,946 | 7/1978 | McCollough | 427/424 |
| 4,156,398 | 5/1979 | McDaniel | 427/286 X |
| 4,287,223 | 9/1981 | Hackert et al. | 427/286 |
| 4,346,668 | 8/1982 | Pohler et al. | 118/665 |

Primary Examiner—Shrive P. Beck
Attorney, Agent, or Firm—Ralf H. Siegemund

[57] ABSTRACT

Painting a band on elongated stock having an elongated edge by means of a spray gun placed at a particular distance from the stock which is controlled by a driven spindle mounting the gun. A scanning unit has a particular distance from the edge of the stock and scans an edge of a painted band, and a control circuit is connected to the scanning unit and operates the spindle drive for maintaining the spray gun on the spindle in a particular position relative to the edge of the stock.

3 Claims, 3 Drawing Figures

PAINTING A BAND ON A TUBE

DESCRIPTION OF THE INVENTION

It is an object of the present invention to provide a new and improved method and equipment for providing an optically contrasting line or band onto a tube or other elongated rolled stock from which subsequently, i.e., in subsequently effective working stages, a particular geometric configuration can be derived for purposes of testing or other working.

It is a specific object of the present invention to provide a new and improved method of applying a painted line or band onto a piece of elongated stock under utilization of a free spray jet.

In accordance with the preferred embodiment of the present invention, it is suggested so scan one of the edges of the painted-on band with regard to a particular position thereof it is to have in relation to a longitudinal edge of the stock and to control the position of the spray gun in response to that measurement; in particular, the spray gun is adjusted transversely to the direction of extension of the band to be painted on, by means of a spindle which is driven by a scanning unit which monitors the one edge of the band being painted on. It was found that the inventive method is highly reliable, produces reproducible results with comparatively small technical expenditure. Moreover, the accuracy of the equipment and of the resulting band, particularly, for example, in relation to an edge of a tube to be welded, is significant.

BACKGROUND OF THE INVENTION

The present invention relates to method for applying a marking upon elongated stock and with particular reference to an edge under a utilization of a free dye jet.

Upon longitudinally seam-welding a split tube along the adjoining edges, one conducts occasionally a follow-up test concerning the quality of the weld, or the welding zone is subjected to an annealing process. This means that certain equipment such as test equipment or annealing equipment has to be guided along that weld. In a most simple manner, this is done by operating personnel, strictly on the basis of visual observation. Another method uses a pasted-on ribbon or one ascertains the temperature profile as an indication of the location of the zone to be inspected or treated, etc.

The visual observation is, of course, the most simple mode of procedure but has proven to be unreliable. Automated equipment which has been used was also found to be unreliable, and particularly reproducability of results are rarely attainable even if the expenditure and technical complications are extensive.

DESCRIPTION OF THE DRAWINGS

With these and other objects in view, the invention consists in the construction, arrangement, and combination of the various parts of the device, whereby the objects contemplated are attained as hereinafter set forth, pointed out in the claims, and illustrated in the accompanying drawings:

Proceeding now to the detailed description of the drawings, FIG. 1 illustrates a tube 1 which is a split tube and has a gap including particularly an edge 1a. The purpose of the equipment is to provide a colored line, or band, i.e., a linear marking of finite width and with well-defined edges, at least one thereof is to be located with reference to edge 1a. Accordingly, there is provided a jet or dye gun 2 which ejects a particular fast-drying dye (drying time about 2 seconds) towards the pipe 1 to, thereby, paint a line or narrow band 4 upon the pipe. Gun 2 sits on a holder 21 which, in turn, is geared to a spindle 3 to adjust the position and particularly the relative height of the gun vis-à-vis the tube, its axis and, indirectly, the edge 1a. The spindle 3 can be turned by means of a suitable drive 7 which, in turn, is under control of a circuit 6, basically of known and fairly simple construction. The features of this particular circuit will be discussed shortly. The control circuit 6 receives inputs from scanning station unit 5 which includes particularly three optical scanners 8, 9 and 10. These scanning units 8, 9, and 10 are particularly positioned in relation to each other and, as a group, in relation to the tube and, here again, the edge 1a.

Figure 1:
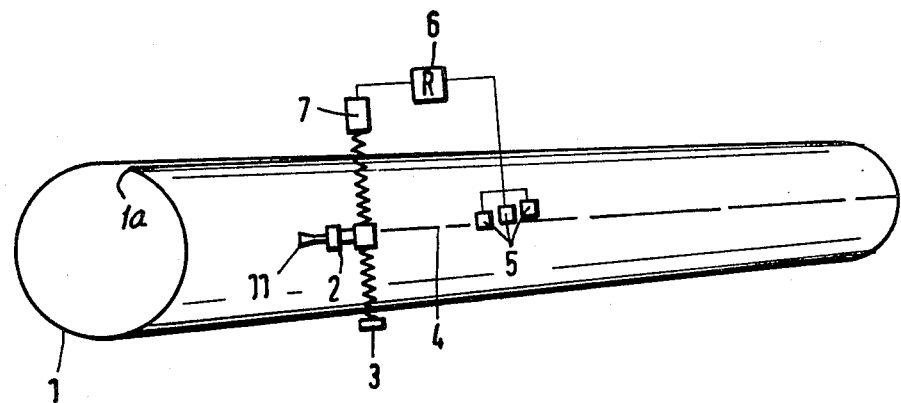
FIG. 1 is a perspective view of a tube with associated equipment for practicing the preferred embodiment of the present invention in accordance with the best mode thereof, the equipment being shown somewhat schematically.
Figure 2:
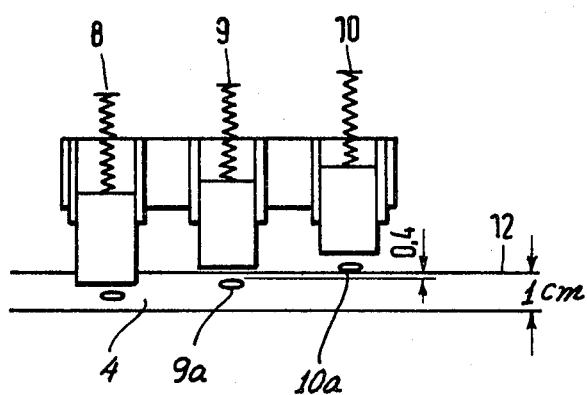
FIG. 2 illustrates somewhat schematically the scanning unit of the system shown in FIG. 1.
Figure 3:
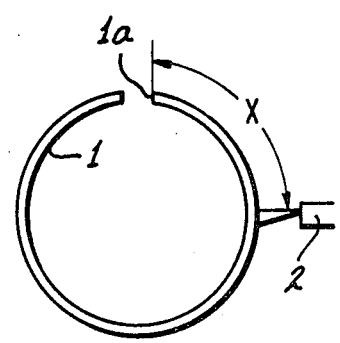
FIG. 3 is a cross section through the tube shown in FIG. 1 in the plane of dye application.

Turning briefly to FIG. 2, the band written by means of the spray gun has an upper edge 12 which, of course, is not sharply defined; but there is a narrow zone in which the amount of dye decreases from the full coverage of the substrate underneath to the unpainted portion of the tube. That particular zone of tolerance is, for example, 0.4 mm. The scanning station 5 is now constructed that a particular spot 9a is scanned by the unit 9, this being a sharp projected light spot, the reflection of which is scanned by a photoelectric detector inside unit 9. Spot 9a is located slightly below the fuzzy zone and under normal circumstances is reflected by fully painted portions of the line or band 4. The analogous scanning spot 10a for unit 10 is disposed to be tangent to the upper edge 12 of the band 4. It can thus be seen that, in the case of a relative shift between the band as painted and sprayed and the scanning unit, reflection from the two spots will vary and these variations are opposite one. One may assume, for example, that the paint reflects more than the normal gray surface of the tube so that in the case of a relative down-shift of the band the reflection of scanning spot 9a, as detected by the detector in scanning unit 9, will decrease, while in the case of a relative up-shift of the band, the reflection of scanning spot 10a as detected by the detector in scanning unit 10 will increase. These signals are furnished to the control unit 6 which will issue appropriate signals to the drive 7 in order to lower or raise the spray gun position as the case requires. The scanning unit 8 detects whether or not there is complete escape or complete interruption of any paint in order to stop the control operation as some form of intervention is needed, for example, replenishing the paint supply, unplugging the spray gun or adjusting the system completely because for some reason, the control range was left by the system.

As far as general operation is concerned, it should be pointed out that initially the unit 2 is adjusted so that, in fact, the band has the distance X from the edge. Furthermore, the particular unit 5 is now adjusted so that, for example, the center of the scanning spot of scanning unit 8 has precisely that distance X if it is assumed that distance X is measured from the edge to the center line of the jet ejected by spray gun 2. Some additional adjustment may be required in order to accommodate the specific fan-out situation provided by the jet because ultimately it is, of course, necessary that the two units 9 and 10 are adjusted tangent to the edge 12 of the band 4 as was described. This initial adjustment, then, serves as a perpetuation of referencing the edge 1a to the position of the band to be painted because the particular unit 5 retains that position. In a refined system, any deviation of the edge 1a of the pipe passing through, from the reference position assumed to be maintained, may be subject to additional control to, thereby, slave the position of the scanning unit 5 to the actual position of the edge 1a, and that, in turn, of course affects the control operation of the position of the spray gun. It can thus be seen that by operation of this particular control, the spray gun 2 is positioned to cause a colored band to be written on the tube which has indeed a particular distance and spacing X from one of the edges of the tube.

While particular embodiments of the present invention have been shown and described, it will be obvious to those skilled in the state of the art that changes and modifications may be made without departing from the invention in its broader aspects, and, therefore, the aim of its appended claims is to cover all such changes and modifications as fall within the true spirit and scope of his invention.

Having described the invention, what is claimed as new in support of the Letters Patent is as follows:

1. Method of controlling the position of a colored band on a split tube and in relation to a longitudinal edge thereof, being one edge of a bent plate, there being an adjustable spray gun for providing said band, comprising the steps of positioning a scanning unit in particular relation to said edge, the particular relation defining a position of an edge of the band;

scanning the edge of the band as it has been painted by the spray gun; and adjusting the spray gun in dependence upon the scanning so as to maintain the particular relation between the band and the edge of the split tube throughout.

2. Method as in claim 1 and using a dye with a drying time of less than 2 seconds.

3. Method as in claim 1 and positioning the spray gun at a distance from the stock to obtain a band of a width of about 1 cm.

* * * * *